United States Patent [19]

Courtot

[11] 3,937,499
[45] Feb. 10, 1976

[54] MOUNTING FOR NONMETALLIC VALVES

[75] Inventor: Louis B. Courtot, Euclid, Ohio

[73] Assignee: The Weatherhead Company, Cleveland, Ohio

[22] Filed: Sept. 23, 1974

[21] Appl. No.: 508,522

[52] U.S. Cl. ............... 285/319; 285/61; 285/372; 285/DIG. 22
[51] Int. Cl.² ........................................ F16L 39/00
[58] Field of Search ............ 285/61, 305, 319, 369, 285/137 R, 417, 418, 419, 372, 373, DIG. 22

[56] References Cited
UNITED STATES PATENTS

| | | | |
|---|---|---|---|
| 2,952,830 | 9/1960 | Sperzel et al. | 285/DIG. 22 |
| 3,229,998 | 1/1966 | Pennington | 285/419 |
| 3,565,465 | 2/1971 | Wemyss | 285/374 |
| 3,684,318 | 8/1972 | Eckert | 285/305 |

FOREIGN PATENTS OR APPLICATIONS

| | | | |
|---|---|---|---|
| 648,266 | 10/1962 | Italy | 285/137 R |
| 498,350 | 12/1953 | Canada | 285/319 |
| 774,641 | 9/1934 | France | 285/419 |

*Primary Examiner*—Dave W. Arola
*Attorney, Agent, or Firm*—McNenny, Farrington, Pearne & Gordon

[57] ABSTRACT

A fluid receiving body and bracket assembly in which fluid pressure loads and external loads on the assembly are sustained by a bracket member embracing the body whereby shear forces on the body port areas are eliminated to thereby permit the body to be formed of a nonmetallic material having limited elongation and shear strength properties. A second bracket member telescopes over the first bracket member to lock the body therebetween in an assembled condition while the first bracket member includes means for fastening the assembly to a supporting object.

5 Claims, 2 Drawing Figures

MOUNTING FOR NONMETALLIC VALVES

BACKGROUND OF THE INVENTION

The invention relates to valve bodies and the like and, more specifically, to an assembly for coupling a fluid line to a nonmetallic body.

PRIOR ART

Fluid receiving bodies for valves, manifolds, pressure responsive devices, and other like apparatus to which fluid lines are coupled are normally formed of metal to provide adequate mechanical strength. The particular metal or alloy chosen for a given application generally depends on service pressure, chemical properties of the fluid being handled, service environment, material cost, machineability or formability. Nonmetallic materials, and particularly rigid plastics, while generally providing corrosion resistance, formability, and low fabrication cost, have ordinarily not been used in the manufacture of housings or bodies because of their characteristic low shear strength. Relatively high shear stress often occurs at threaded ports or coupling points as a result of high pressures, external axial loading on a coupled line, or excessive torque applied to a threaded fitting. It has been attempted to avoid the problem of low mechanical strength of various plastics by providing metallic inserts in relevant areas of plastic bodies. While such composite structures may more readily withstand high shear forces at a coupling point, this approach is relatively expensive.

SUMMARY OF THE INVENTION

The invention comprises a bracket and fluid receiving body assembly in which bracket means in engagement with the body sustains the fluid pressure coupling load and normally expected externally applied loads. With the coupling and external loads transferred by the bracket means from critical coupling areas of the body, the required shear strength of the body material is advantageously reduced, thereby making possible the selection of nonmetallic materials for use in fabricating bodies. The bracket means, ideally, is arranged to embrace the body in a manner in which the body may be conveniently mounted to a supporting object through the bracket means without separate fastening provisions on the body.

In the preferred embodiment, the bracket means includes a pair of cooperating U-shaped members having their leg portions proportioned to telescope over one another, with the members facing each other. The inside dimensions of a first one of the bracket members generally correspond to those of a rectangular body, thereby permitting the body to be nested in the first member. The second bracket member is arranged to close off the open face area formed between the legs of the first member and thus capture the body between the members. Ideally, the first bracket member is relatively rigid and includes on at least one of its legs an open-ended slot for receiving a fluid conducting line extending from a port on an adjacent face of the body. The slot is arranged to engage a shoulder on the fluid line so that the line is maintained in sealing relation with the port. The legs of the other bracket member preferably are somewhat flexible to permit temporary expansion over the legs of the first member during initial assembly movement and clasping over the first member at the completion of the assembly. As disclosed, each body port is arranged to accomodate an O-ring seal on an end portion of a coupled line, thereby avoiding the introduction of shear forces to the port area.

DESCRIPTION OF THE PREFERRED EMBODIMENT

Figure 1:
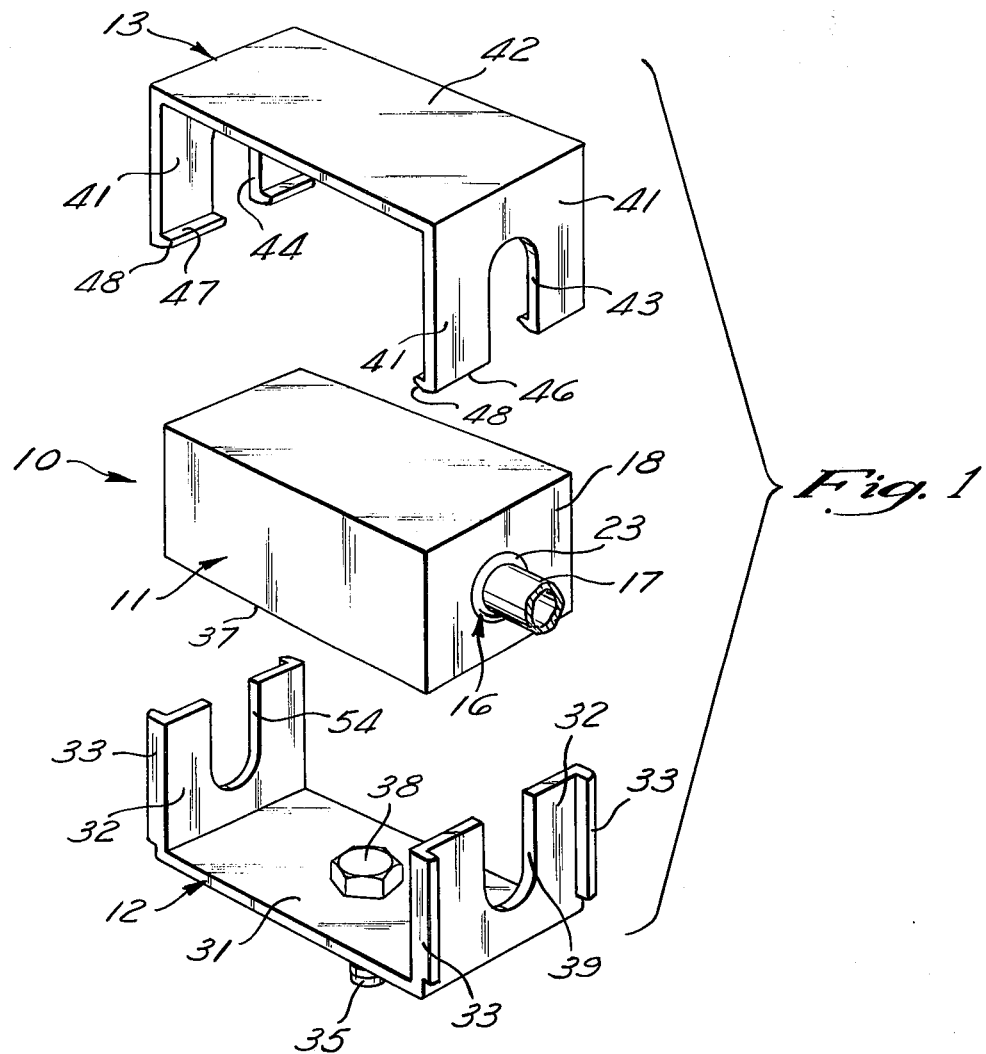
FIG. 1 is an exploded view of a bracket and fluid receiving body assembly embodying the principles of the invention.
Figure 2:
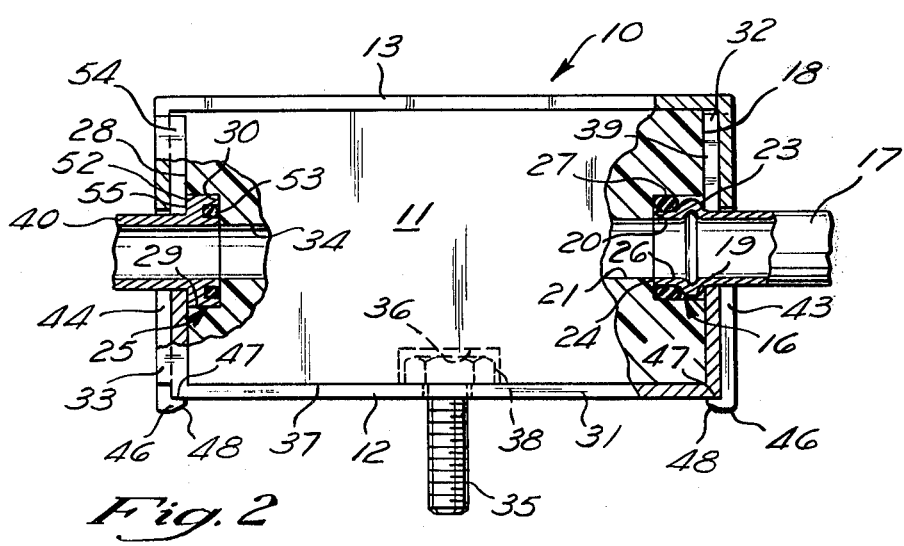
FIG. 2 is an elevational view of the assembly of FIG. 1, partially in section, illustrating the parts of the assembly in a mated relationship.

An assembly 10 embodying the invention comprises a fluid receiving body 11 and a pair of mating bracket members 12 and 13. The body or housing 11 representing a valve body, manifold block, pressure transducer, or other like device, in which fluid is controlled, distributed, sensed, or otherwise employed, is a generally rectangular parallelepiped or block. The body 11 is made of nonmetallic material of limited mechanical strength in comparison to material commonly used for like bodies, such as cast iron, steel, aluminum, or brass. Suitable materials for forming the body 11 include thermoplastic and thermosetting plastics, e.g., nylon, Teflon, polyethylene, polyvinyl chloride, poly(amide-imide)s such as that marketed under the trademark "Torlon" by Amoco Chemicals Corporation, acrylic epoxy, polyester, glass or similar crystalline substance, and particle filled and/or filament reinforced plastics.

The body 11 is provided with at least one port 16 for coupling a fluid conducting line 17 to the interior of the body. The port 16 is centrally located in a planar end face 18 of the body 11 and includes a cylindrical counterbore 19 terminating within the body at a radial shoulder or surface 20 and an inner cylindrical bore 21. The inner bore or passage 21 communicates with the interior of the body.

The illustrated fluid conducting line 17 is a cylindrical metallic tube which has been bumped or upset to form a radially extending peripheral flange 23. The radial flange 23 is spaced from an end 24 of the line 17 to provide a short cylindrical length 26 on which an elastomeric O-ring 27 is externally positioned. As illustrated, the flange 23 is dimensioned to freely pass into the bore 19, while the O-ring 27 is slightly compressed between the bore 19 and end portion 26 of the tube to provide a fluidtight seal between the bore and tube surfaces. The tube end portion 26 and the flange 23 are dimensioned such that the rear or outward face of the flange is coplanar with the body end face 18 when the end portion is in abutting contact with the radial shoulder 20 at the inner end of the bore 19.

A second port 25 is provided on an end face 28 opposite the first port 16. The port 25 includes a cylindrical counterbore 29, an inner radial face 30, and an inner bore or passage 34. An associated fluid conducting line or tube 40 is shown, for the purposes of illustrating one variation of tube coupling from that shown at the port 16, with an end structure which provides a face seal against the inner radial port face 30. A radial flange 52 is welded or otherwise formed on the coupled end of the line 40. An annular concentric groove in the forward face of the flange 52 carries an elastomeric O-ring seal 53 in engagement with the inner radial face 30.

The lines 17 and 40 are used to conduct fluid, either liquid or gas, to the interior of the body 11, where the fluid is sensed, controlled, or distributed by conventional means (not shown) forming no part of the present invention.

The bracket members 12 and 13 serve to mount the body 11 and maintain the lines 17 and 40 in coupled relationship with the body. The lower bracket, as viewed in the Figures, has a rectangular U-shaped configuration. A midportion or web 31 of the bracket has integral, upstanding legs 32 at opposite ends extending at right angles to the plane of the midportion. The bracket 12 is conveniently formed as a stamping of steel or other rigid metal sheet stock of a material gauge and strength adequate to be relatively inflexible under forces normally expected during joining of the members and during service. Each of the legs 32 has a pair of outwardly turned flanges 33 which serve to stiffen the legs and interlock with the upper bracket 13.

A fastener 35, in the form of a threaded bolt, projects through a hole in the bracket midportion 31 to provide means for securing the bracket 12 to an object on which the body 11 is to be mounted. A recess 36 is formed in a lower face 37 of the body 11 for reception of a head 38 of the fastener 35. Alternatively, the fastener 35 may be projection welded on the outer surface of bracket 12 and may be unthreaded for reception of a holding clip.

An open-ended slot 39 is formed in the free end of the leg 32 associated with the body port 16. The width of the slot 39 is slightly larger than the outside diameter of the line 17 and somewhat less than the bore 19 and tube flange 23. Similarly, an open-ended slot 54 allows the opposite bracket leg 32 to straddle the line 40. The tube flange 52 is retained in the bore 29 by surface portions of the associated bracket leg 32 surrounding the slot 54. The axial distance between a rearward surface 55 of the flange 52 from the leading or inner surface of the O-ring 53 in an unconfined state is such that a predetermined axial compression of the O-ring against the radial surface 30 is developed as this rearward flange surface is engaged by the leg 32.

The upper bracket 13 has a rectangular U-shaped configuration, like that of the lower member 12, again with leg portions 41 integral with and extending perpendicularly to a midportion 42 of the bracket. The legs 41 are spaced apart to telescope over the legs 32 of the lower bracket member 12, and are dimensioned to slide between the leg flanges 33. Open-ended slots 43 and 44, corresponding to the lower slots 39 and 54, are provided at the body ports 16 and 25, each having a width sufficient to clear their respective lines 17 and 40. The free edges, designated 46, of the legs 41 are turned inwardly to provide clasping surfaces 47 to engage the lower surface of the web 31. The edges 46 include beveled or camming surfaces 48 adapted to spread their associated legs 41 over the opposite legs 32 of the body 12 during assembly. The upper bracket member 13 is ideally stamped of steel or other structural metal of a relatively light gauge to provide adequate flexibility for spreading of the legs 41 over the body 12 during assembly of the members.

In coupling the lines 17 and 40, the line end portions, carrying the O-rings 27 and 53, are fully inserted in the body bores 19 and 29. The body 11 and tubes 17 and 40 are then positioned in the lower bracket 12, with the tubes extending through the slots 39 and 54. The upper bracket 13 is then pushed over the lower bracket 12 and body 11 with the cam surfaces 48 spreading the legs 41 until the inturned clasping surfaces 47 snap into engagement with the lower surface of the web 31. Engagement between the body recess 36 and fastener head 38 limits movement of the body 11 in a plane parallel to the planes of the bracket webs 31 and 42, as does engagement between the tube and bracket slots.

The axial fluid pressure loads on the lines 17 and 40, tending to separate the lines from the body 11, as well as any normal externally applied tensile loads on the lines, is sustained by interengagement between the associated bracket legs 32 and tube flanges 23 and 52.

Where a different number of ports than that illustrated is required, the body 11 may be so provided on either or both end faces 18 and 51, and the bracket members 12 and 13 may be provided with slots of suitable configuration. Of course, unlike the illustrated body 11, each port may be provided with a common type of coupling seal structure, e.g., all of the seal type illustrated at the port 16. From the foregoing, it may be understood that, in accordance with the invention, the body 11 is isolated from shear loading at its port areas by the bracket members 12 and 13. Hence, a suitable nonmetallic material of limited mechanical strength may be selected for fabrication of the body. The increased range of practical materials permits selection of a particular material which may be readily fabricated as by molding or die casting to finished form at great economy.

While I have described my invention in connection with specific embodiments thereof, it is to be clearly understood that this is done only by way of example, and not as a limitation to the scope of my invention as set forth in the objects thereof and in the appended claims.

What is claimed is:

1. An assembly for coupling a fluid line, comprising a nonmetallic body, said body having means for receiving and sealing the end of a fluid line, and bracket means in engagement with said body, said bracket means including means for resisting forces tending to separate the line from the body, said bracket means including means integral with said force resisting means for mounting said body to said bracket means, said bracket means including snap connecting means for releasably securing said body to said bracket means, said bracket means comprising a pair of interengaged bracket members, said interengaging bracket members having complementary U-shapes, the legs of one of said members being arranged to telescope over the legs of the other.

2. An assembly as set forth in claim 1, wherein one leg of a first of said members is adapted to engage a portion of the tube end to retain it in said body.

3. An assembly as set forth in claim 2, wherein said one leg is slotted to receive said line.

4. An assembly as set forth in claim 3, wherein the legs of one of said bracket members includes locking edges engageable with a web portion between the legs of the other bracket member.

5. An assembly comprising a body for a valve or the like, said body having a configuration of a substantially rectangular parallelepiped, a port on a first face of the body including a tube end receiving bore, a second face on said body opposite said first face, a first rectangular U-shaped bracket in engagement with said body, said first bracket having a web portion and a pair of integral leg portions extending at opposite ends of the web portion perpendicularly to the plane of the web portion, said first bracket being dimensioned to embrace said body with said faces aligned with said legs, an open-ended slot in one of said first bracket legs adapted to straddle a tube extending outwardly from said body port, said first bracket being sufficiently rigid to permit the leg associated with said slot to retain a tube in coupled relation with said port by engagement of a radial shoulder on the tube, a second rectangular U-shaped bracket in engagement with said first bracket and said body, said second bracket having integral web and leg portions dimensioned to telescope over the first bracket with the body received between the first and second brackets, said second bracket having an open-ended slot in one leg corresponding to the slot of the first bracket whereby the second bracket is positionable over the body and the first bracket while a tube extends from said port through the first bracket slot, the free ends of the second bracket legs including inturned clasping surfaces adapted to lockingly engage the web of the first bracket when the second bracket is fully assembled on the first bracket.

* * * * *